United States Patent

[11] 3,619,514

[72] Inventor Eugene B. Barcaro
Norristown, Pa.
[21] Appl. No. 852,973
[22] Filed Aug. 18, 1969
[45] Patented Nov. 9, 1971
[73] Assignee Sperry Rand Corporation
New York, N.Y.
Continuation of application Ser. No. 560,353, May 2, 1966.

[54] MULTICHANNEL PLATED WIRE MAGNETIC HEAD
1 Claim, 4 Drawing Figs.

[52] U.S. Cl. ..... 179/100.2 C
[51] Int. Cl. ..... G11b 5/20, G11b 5/22
[50] Field of Search ..... 179/100.2 C; 340/174.1 F; 346/74 MC

[56] References Cited

UNITED STATES PATENTS

| | | | |
|---|---|---|---|
| 3,495,230 | 2/1970 | Best | 179/100.2 |
| 3,224,074 | 12/1965 | Peters | 179/100.2 C |
| 2,647,167 | 7/1953 | Rettinger | 179/100.2 |
| 2,694,754 | 11/1954 | Connell | 179/100.2 |
| 2,941,045 | 6/1960 | Connell | 179/100.2 |
| 3,145,452 | 8/1964 | Camras | 179/100.2 |

FOREIGN PATENTS

| | | | |
|---|---|---|---|
| 846,009 | 8/1960 | Great Britain | 340/174.1 |

*Primary Examiner*—Terrell W. Fears
*Assistant Examiner*—Robert S. Tupper
*Attorneys*—Charles C. English, Thomas P. Murphy and Griffin and Brainigan

ABSTRACT: The present device is a magnetic read-write head which is formed from an electrically conductive wire which is plated circumferentially with a thin film of magnetizable material and which has a gap formed in the thin film along the length of the wire. The gap serves to provide a break in the flux path in order to effect a recording on a magnetizable recording medium placed in proximity to the gap and also serves as a path for magnetic flux to effect a read out of information from such a magnetizable recording medium. In the preferred embodiment the magnetizable material is plated to the electrically conductive wire under conditions that form an easy axis of magnetization circumferentially around the wire.

INVENTOR
EUGENE B. BARCARO

BY Thomas P. Murphy
ATTORNEY

MULTICHANNEL PLATED WIRE MAGNETIC HEAD

This invention is a continuation of my application Ser. No. 560, 353 filed May 2, 1966 , relates to a magnetic head, and more particularly to a plated wire readout head.

Magnetic recording and reproduction of digital, analog and audio signals is a well established art. Naturally many varied constructions of the readout transducer or magnetic head are in existence. The conventional magnetic head structure consists of a core composed of ferromagnetic material having a coil wound thereon. The core is generally annular in configuration and has an air gap formed therein. In a writing operation the air gap is brought into close or contiguous relationship to the magnetic medium such as an oxide coated tape. Energization of the coil produces a flux in the core and the variation of the signal in the core is magnetically recorded on the magnetic medium via the air gap. Alternately, when the medium has been previously recorded, a signal is induced in the coil as the air gap passes contiguously or closely adjacent to the area of recordation.

An ever present goal in the art of magnetic reading and writing has been to achieve the ultimate in the density with which bits of information may be recorded on the magnetic medium.

The present invention contemplates a magnetic head comprising an electrically conductive wire having a relatively thin coating of magnetic material thereon. A recording gap is formed in said head by removing a portion of the magnetic material to expose a narrow strip of the wire along the longitudinal dimension of the wire.

The magnetic head of the present invention is greatly reduced in size compared to the conventional toroidal magnetic head. This reduction in size is of several magnitudes e.g. the size reduction ratio may be as high as 40 to 1 or more. Aside from being desirable in itself this reduction in size of the magnetic head of the present invention leads to greatly reduced costs of production as well as greatly increased efficiency in production. The small size of the magnetic head of the present invention makes it compatible for use in systems utilizing miniaturization technique developments.

The size of the magnetic head of the present invention is a major factor contributing to another important advantage of the invention which is high density recording. The magnetic head of the present invention is capable of recording approximately 3,000 bits of information per inch of magnetic medium.

High density recording is possible due to the high pulse resolution possible with the magnetic head of the present invention. This is because for a given gap width the low radius of curvature of the magnetic head causes the magnetic material to break away sharply from the recording surface and in so doing greatly reduces the flux fringe area over the flux fringe area associated with the conventional toroidal magnetic head.

The above-mentioned advantages as well as many other advantages of the present invention over the prior art will become clear and made more apparent with the reading of the following description in conjunction with the figures wherein.

Figure 1:
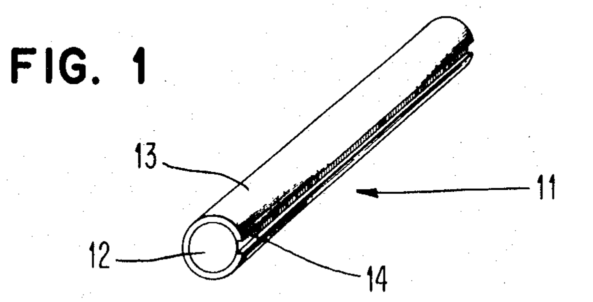
FIG. 1 is a perspective view of a preferred embodiment of the magnetic head of the present invention.

Referring now more particularly to FIG. 1 there is shown a perspective view of the magnetic head 11 of the present invention. The magnetic head 11 comprises an electrical conductor 12 made of a suitable electrically conductive material, for example, a beryllium-copper base material may be used. The electrical conductor or wire 12 shown here as having a circular cross section may have other various cross-sectional shapes, for example, it may be square, rectangular, or triangular, etc. In the embodiment shown the diameter of the wire 12 may have a range of 0.5 to 5 mils. The size of the cross-sectional area has a direct bearing on the amount of current needed in recording with smaller cross-sectional areas requiring less write current. The length of the wire 12 may be of any desired value depending, of course, on the read-write function that is required.

The electrical conductor or wire 12 has a coating of magnetically permeable material 13 formed thereon in some appropriate manner, for example, by an electroplating process. The magnetic material is relatively thin compared to the diameter of the wire 12. For example, with a 5 mil diameter beryllium-copper base electrical conductor a coating of 10,000 angstroms of a nickel-iron alloy with an inner-coating of 20,000 angstroms of copper electroplated to the wire 12. However, any highly permeable magnetic plating will suffice.

A recording gap 14 is formed in the magnetic material 13 by removing a minute amount of the magnetic material 13 to expose a strip of the electrical conductor 12 along its longitudinal dimension. The gap may be formed by scribing by means of a thin pointed instrument or the gap may be formed by removing the magnetic material by methods such as photoetching, abrasion, masked plating, or various other methods available in the art. The width of the gaps may be made as small as 50 micro inches.

In practice the size of the gap 14 employed in the magnetic head of the present invention is comparable to the size of the gap used by the conventional toroidal magnetic head. The electrical conductor 12 is in effect a one turn winding on a magnetic pole piece which is the magnetic coating 13. As will be pointed out in more detail hereinbelow the one turn winding or electrical conductor 12 may be coupled to a power source directly or by connecting wires.

While the gap 14 of the magnetic head 11 of the present invention compared to the gap of a conventional magnetic head may be comparable in width, it is pointed out that the magnetic head 11 of the present invention has inherently high pulse resolution for a given gap size because the low radius of curvature causes the magnetic material 13 of the head to break sharply away from the surface of the recording medium. In other words, and as may be best seen by referring to FIG. 2, the width of the fringing field set up about the gap 14 is many times smaller than the width of the fringing field of a gap of equal width associated with a conventional toroidal magnetic head. In practice this difference in widths may be of the order of 50 times or more.

Figure 2:
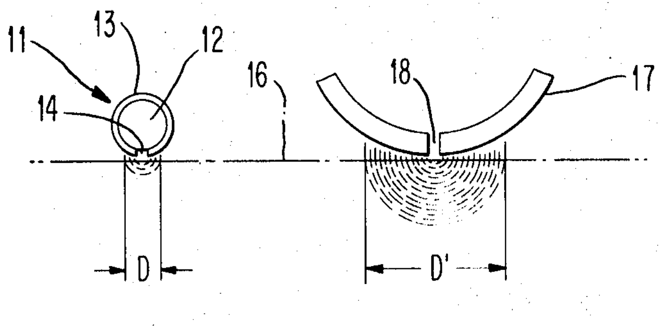
FIG. 2 represents a comparison of the magnetic flux fringe areas between the conventional toroidal head and the magnetic head of the present invention.

FIG. 2 clearly shows this difference (although not in scale) in the widths of the fringing field set up by the different types of recording head within the area of a magnetic medium.

FIG. 2 illustrates the unusually high pulse resolution associated with the magnetic head of the present invention. The magnetic head 11 is shown with its read-write gap 14 in read-write association with a magnetic recording medium 16. In the FIG. 2 the magnetic head 11 is shown energized as by passing a pulse of information current through the electrical conductor 12. This is normally the write condition. In this energization situation a field of flux is generated substantially as shown in the area of the gap 14. This is the magnetic flux that actually causes a change in the magnetic medium 16.

FIG. 2 also illustrates part of the toroidal core 17 of a conventional toroidal magnetic head. Only that part of the core in the area of the recording gap 18 is shown. The width of the gap 18 is equal to the width of the gap 14 of the magnetic head 11. However, as may be seen from FIG. 2, when the toroidal magnetic head is energized to a write condition, a magnetic field of flux having a width $D^1$ is set up within the area of the gap 18. The fringing field of the flux having the width $D^1$ is, as aforesaid, many times larger than the width D of the field of flux associated with the magnetic head 11.

By virtue of the unusually small fringing field associated with the magnetic head 11 recording at unusually large bit densities may be made. For example, densities of 2,000 to 3,000 bits per inch have been achieved with excellent resolution. Much higher densities are, in practice, also possible. The ability to record at high bit densities with the magnetic head 11 is a direct result of the small fringing distances of the magnetic flux which results from the unique structure and small size of the magnetic head 11.

Due to the small fringing field associated with the magnetic head 11 it is possible to record densely packed pulses on a magnetic medium without interference to or from adjacent pulses that would occur when the conventional magnetic head with its wide fringing field were attempted to be used. Similarly magnetic pulses previously recorded on the magnetic medium may be read without interference from closely adjacent pulses.

Figure 3:
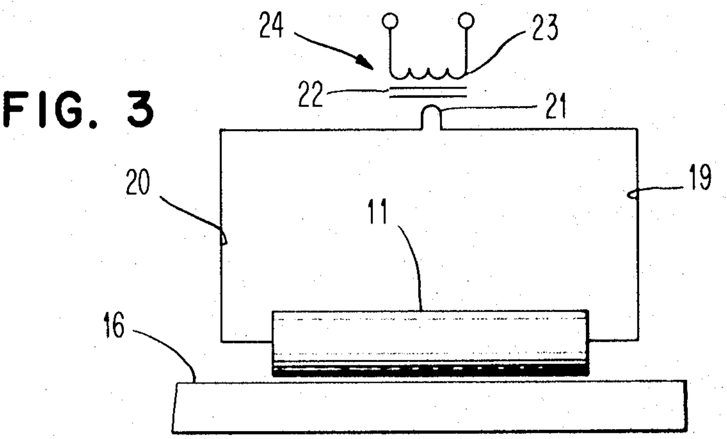
FIG. 3 illustrates a preferred read-write circuit employing the magnetic head of the present invention.

FIG. 3 illustrates the magnetic head 11 of the present invention connected in a circuit for receiving write signals or providing read signals. The magnetic medium 16 which may be a magnetically coated tape card or drum, etc., is shown in read-write relationship to the magnetic head 11. The magnetic medium or tape 16 has a direction of movement perpendicular to the axis of the wire 12 with the surface of the tape 16 passing under the gap 14.

In recording an information pulse of current is applied to the winding 23 of the transformer 24. The pulse of current is transformed into the winding 21 via the core 22 and appears in the winding 21 increased to a magnitude depending on the turn ratio of the transformer 24. The number of turns of the winding 23 is greater than the number of turns of the winding 21 and the turn ratio may be made to any desired value.

The pulse of current passes through the wire 12 via the conductors 19 and 20 and is recorded as a magnetic dipole on the surface of the magnetic medium 16 as it passes under the gap 14. A dipole is recorded by the magnetic head 11, of course, in the same way as one is recorded by a more conventional magnetic head, i.e., the fringing field of flux is magnetically coupled to the magnetic medium and in so doing places a dipole on the recording track.

THe polarity of the write pulse is determined by the direction of the current conduction through the conductor 12 and, therefore, the sense of the dipole recorded on the magnetic medium 16 is determined. Thus, current in one direction through the electrical conductor 12 may cause a dipole representative of the bit binary "1" to be recorded on the magnetic medium 16 while the current in the opposite direction causes a dipole indicative of the bit binary "0" to be recorded on the magnetic medium 16. This is so because the sense of direction of the current through the electrical conductor 12 determines the circumferential direction (clockwise or counterclockwise) of the magnetic field induced in the magnetic coating 13. Thus, the magnetic field may have a direction clockwise or counterclockwise about the wire 12 dependent on the polarity of the write input pulse. Although not essential to the present invention, it may be noted that the magnetic material 13 may be made highly permeable in the circumferential direction by providing a circumferential orienting magnetic field when the magnetic material is electroplated to the wire 12. With such an arrangement the pulse power required to write is considerably reduced.

The magnetic head 11 may also be used as a read head. When the magnetic head 11 is used as a read head, the transformer 24 is utilized as a voltage step-up transformer. Thus, when the gap 14 comes into magnetic coupling with a recorded bit of information (a magnetic dipole) on the magnetic medium 16, a circumferential magnetic filed is induced in the magnetic material 13 in a direction (clockwise or counterclockwise) depending upon the sense of the dipole, that is according to whether a binary "1" or binary "0" had been recorded on the magnetic medium 16. This field causes a voltage to be momentarily induced in the winding 21 which is transformed into a larger voltage appearing in the winding 23. The output of the winding 23 may be connected to an appropriate readout element. Naturally, when the gap 14 leaves the area of the recorded dipole another voltage is generated in the winding 21 of an opposite polarity to the one previously generated. Either one of these voltage pulses may be used as the readout information. The polarity of the voltage pulse chosen is indicative of the sense of the magnetic dipole recorded on the magnetic medium 16 and, therefore, is indicative if a binary "1" or a binary "0."

Of course, the length of the magnetic head 11 may be of any desired value. If it were being used to record or read a single channel on the magnetic medium 16, the length would be chosen to be relatively short. The magnetic head 11 of FIG. 3 records a magnetic variation or dipole on the magnetic medium 16 having a length equal to the length of the gap 14. The magnetic head 11 of the present invention, however, lends itself to a multichannel magnetic head of unusually simple structure.

Figure 4:
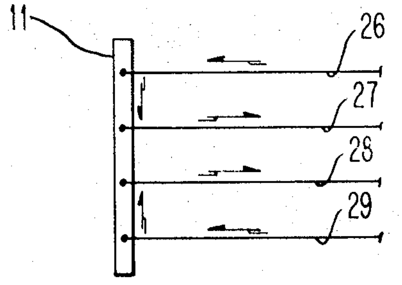
FIG. 4 is a schematic view of the magnetic head of the present invention being used as a multichannel head.

As shown in FIG. 4, a single magnetic head 11 may, in fact, comprise any number of recording heads or channels. FIG. 4 illustrates the present invention used as a multichannel head. The number of channels capable of being constructed from a single piece of the plated wire of the present invention is limited only by the length of the plated wire. The conductors 26 and 27 are connected to a length of the electrical conductor 12 (not shown) of the magnetic head 11 and that length defines a single channel. The other ends of the conductors 26 and 27 will, of course, be connected to the read or write circuits. The electrical conductors 28 and 29 are likewise connected to another length of the electrical conductor 12 of the magnetic head 11 forming another read-write channel. The other ends of the electrical conductors 28 and 29 would, of course, be connected to appropriate read or write circuits.

Only that length of the magnetic head 11 connected between the electrical conductors 26 and 27 or 28 and 29 becomes a functional magnetic head in response to write signals from an external circuit or read signals induced in the respective length of the magnetic head. Thus, for example, a binary "1" may be recorded on one track of a recording medium by application of the appropriate signals between the conductors 26 and 27. At the same or a different time a signal of opposite or like polarity, may be recorded on another track of the recording via the length of the magnetic head defined by the electrical conductors 28 and 29 by an appropriate signal applied thereto.

Similarly, read signals of like or unlike polarities may be induced in the magnetic head 11 as the lengths of gap 14 between the conductors 26 and 27 or 28 and 29 respectively pass over recorded data. Thus, any number of magnetic heads may be constructed from a single magnetic head or plated wire of the present invention. The number itself is limited only by the length of the plated wire itself.

In actual practice various other circuit configurations may be sued in conjunction with the magnetic head of the present invention. For example, to achieve high amplification with low noise pickup an integrated circuit differential amplifier may be placed in the head directly across the electrical conductor 12. Where more gain is desired, a transformer may be connected to the amplifier output.

To achieve the lowest possible inductance as well as the shortest possible circuit path to provide high head current, the magnetic head of the present invention may be constructed in a shorted turn transformer configuration where the magnetic head is also a turn on the transformer. Thus, the magnetic head as a turn on a core of the transformer can be directly energized without the need of any further inductive coupling. The whole assembly then can be potted to form a unitary magnetic head in an extremely small package. If this configuration were used, gain could be improved by providing a microcircuit in the magnetic head or plated wire path.

Other modifications of the present invention are possible in light of the above-described embodiments.

What is claimed is:

1. A multichannel read-write head comprising:

a. an elongated nonmagnetic electrically conductive wire of uniform cross section, b. a continuous coating of magnetic material deposited upon said wire, c. an axially oriented channel formed in said magnetic coating along the length of said wire, d. a plurality of input-output connections electrically made to said wire at a plurality of spaced points along its length, each pair of adjacent connection points forming a separate input-output signal connection for each read-write head, said axially oriented channel in said coating being operative to form the read-write gaps for said read-write heads and having a width which is independent of any cross-sectional dimension of said wire.

* * * * *